United States Patent [19]

Cogert

[11] Patent Number: 4,841,378
[45] Date of Patent: Jun. 20, 1989

[54] VIDEO CAMERA ENABLEMENT SYSTEM UTILIZING A VIDEO CASSETTE CHARACTERISTIC

[75] Inventor: Harmon I. Cogert, Woodland Hills, Calif.

[73] Assignee: Short Takes, Inc., Minneapolis, Minn.

[21] Appl. No.: 152,335

[22] Filed: Feb. 4, 1988

Related U.S. Application Data

[63] Continuation-in-part of Ser. No. 914,307, Oct. 2, 1986, abandoned.

[51] Int. Cl.⁴ .............................................. H04N 5/76
[52] U.S. Cl. ..................................... 358/335; 360/69; 360/27; 369/47; 369/50
[58] Field of Search ............... 358/335, 342, 310, 906, 358/909; 360/55, 69, 137, 27, 74.4, 74.5; 369/12, 33, 50, 52, 47; 354/290, 291

[56] References Cited

U.S. PATENT DOCUMENTS 4,363,051 12/1982 Maeda et al. .................. 358/335 X
4,688,105 8/1987 Bloch et al. ......................... 358/335

Primary Examiner—Robert L. Richardson
Attorney, Agent, or Firm—Merchant, Gould, Smith, Edell, Welter & Schmidt

[57] ABSTRACT

An audio-video recording system employs a booth containing a video camera and microphone, a video display screen and timing means connected to the camera to operate it for a predetermined period. The signal from the camera is recorded on a video cassette recorder. Means are provided for distinguishing authorized video cassettes from unauthorized video cassettes enabling the system for recording when an authorized signal is received and preventing recording on an unauthorized cassette. Preferably, the authorizing signal is prerecorded on the tape of the video cassette and erased upon use of the cassette.

10 Claims, 3 Drawing Sheets

VIDEO CAMERA ENABLEMENT SYSTEM UTILIZING A VIDEO CASSETTE CHARACTERISTIC

BACKGROUND OF THE INVENTION

This is a continuation-in-part of my co-pending patent application Ser. No. 914,307, filed Oct. 2, 1986, (now abandoned) the subject matter of which is hereby incorporated by reference.

One out of every three homes in the United States is now provided with a video cassette recorder (VCR), and it is expected that more than eight million new VCR's will be sold in 1986. The rapidly increasing use of VCR's has been made possible because they can be sold at an affordable price. On the other hand, audio-video equipment capable of recording both picture and sound on magnetic tape cassettes is much more expensive than VCR's, and thus most persons have heretofore not been able to enjoy making video-voice recordings of themselves or their friends for display on home television sets by use of VCR's.

SUMMARY OF THE INVENTION

The invention disclosed herein relates to an audiovisual recording system for use by the general public. More particularly, the subject invention relates to such a recording system which can conveniently be used by ordinary persons to make audio-video tape cassettes at reasonable cost, the cassettes being of such size that they can be mailed to relatives or friends as remembrances which have greater appeal than letters or greeting cards. A preferred embodiment of the invention comprises a booth accommodating one or more persons and housing a video camera equipped with a microphone; both the camera and the microphone being placed in operation for a predetermined period when an authorized magnetic tape cassette is inserted into a video cassette recorder in the recording system. The picture signal produced by the video camera and the sound signal produced by the microphone are recorded on a magnetic tape cassette, and the cassette is thereafter released to the person who has used the system to record his picture and voice.

The preferred embodiment of the invention further comprises a pair of video display screens which show the taken picture as it is being recorded, one of these screens being located inside the booth so that the person using the system can see his image thereon and the other screen being placed on an outer wall of the booth so that persons passing the booth will be attracted by its display. A video display cassette supplied to a customer may be provided with prerecorded video and audio signals which are respectively fed to the video display screen located outside the booth and to a speaker associated herewith, thereby providing the customer with instructions or demonstration pictures before his own picture is captured inside the booth.

Use of an unauthorized tape cassette in the recording system is precluded by means which sense a nonconforming physical characteristic of such a cassette and consequently prevent operation of the system. The characteristic is preferably a prerecorded signal on the tape of the cassette, and is erased when the cassette is first used to prevent reuse. Other advantageous features of the invention will be presented in the following detailed description thereof.

DETAILED DESCRIPTION OF THE PREFERRED EMBODIMENT

Figure 1:
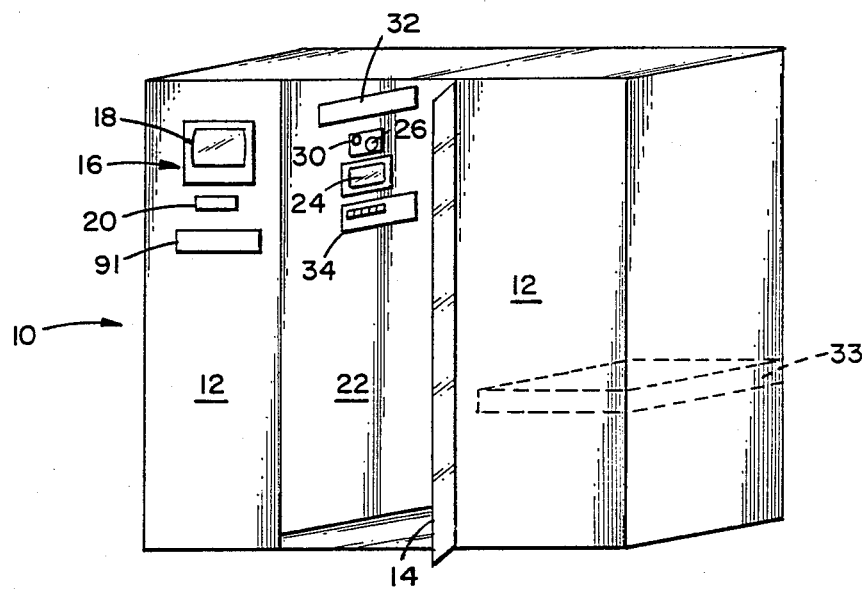
FIG. 1 is a pictorial representation of the person-accommodating booth used in the preferred embodiment of the invention.
Figure 2:
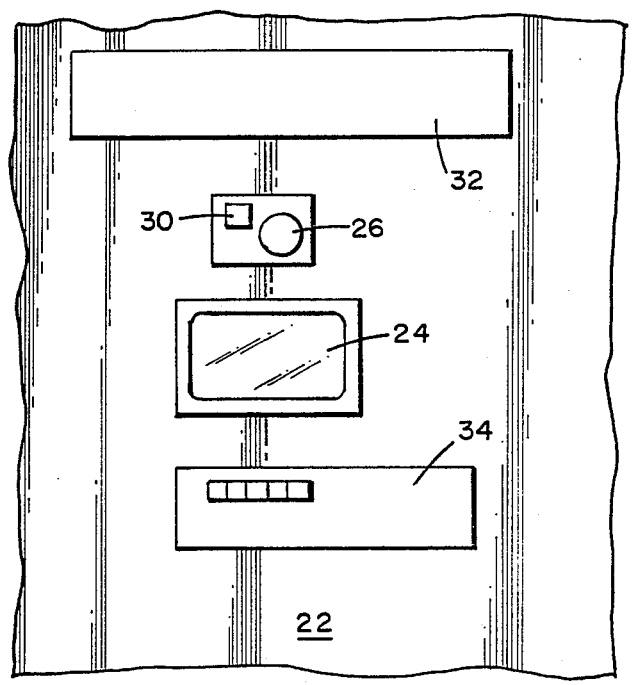
FIG. 2 is a view illustrating an inside wall of the booth shown in FIG. 1.

In FIG. 1 reference number 10 generally designates a booth having a front wall 12 with a door 14 centrally located therein and illustrated standing open to reveal part of the inside of the booth. Also mounted on the front wall of the booth 10 is a television set which is generally designated by reference number 16 and which comprises a display screen 18 and a speaker 20. A partition wall 22 extends across the booth 10 adjacent the opening for the door, a portion of which partition wall is also illustrated in FIG. 2.

The partition has an opening for the display screen 24 of a second television set which will be further described hereinafter. The wall 22 also includes an opening for the lens 26 of a video camera generally designated by reference number 28 in FIG. 3.

Many conventional video cameras such as Model 1CVC6033E manufactured by General Electric may be used. A microphone 30 is positioned adjacent the lens of the video camera as part of the audio-visual signal generating equipment. Positioned above the camera is a light 32, and below the camera is the front panel 34 of a video cassette recorder which is generally designated as VCR 1 in FIG. 3 and which will be further described hereinafter. A seat 33 extends across the booth opposite the partition wall.

All electrical components described hereinafter are housed in the booth behind the partition 22. The video signals produced by the video camera when it is operating are transmitted through a cable 40 to VCR 1. In a preferred embodiment of the invention, the recorder is simple and rugged, such as Model 9-7100 manufactured by General Electric or many other makes of conventional VCR. The audio signal produced by the microphone is fed through a conductor 42 to a preamplifier 44 and thence through a lead 46 to VCR 1. The preamplifier 44 is also connected by a lead 48 to a power supply 50, and the latter is connected by a lead 54 to a relay which will be referred to hereinafter as the action switch relay. This action switch relay 54 is connected (1) by a lead 56 to a switch 58 which will be referred to hereinafter as the action switch, and (2) by a video record control lead 60 and an audio record control lead 62 to electrical components within VCR 1 which provide for recording of the video and audio signals produced by the camera and microphone respectively.

A lead 64 connects VCR 1 to a relay 66 which will be referred to hereinafter as the time expiration relay, and the latter is in turn connected by a lead 68 to a relay 70 which will be referred to hereinafter as the tape relay. Time expiration relay 66 is, in addition, connected to VCR 1 by a lead 62. A lead 74 connects lead 72 to a relay 76 which will be referred to hereinafter as the unauthorized tape reject relay; a lead 78 connects the unauthorized tape reject relay 76 to the tape relay 70;

and a lead 80 connects the tape relay to a switch 82 mounted in VCR 1. A video lead 84 connects VCR 1 to a television set 86, the display screen 24 of which is depicted in FIGS. 1 and 2. A lead 87 connects VCR 1 to a signal light 88 located in the partition wall inside the booth.

Figure 3:
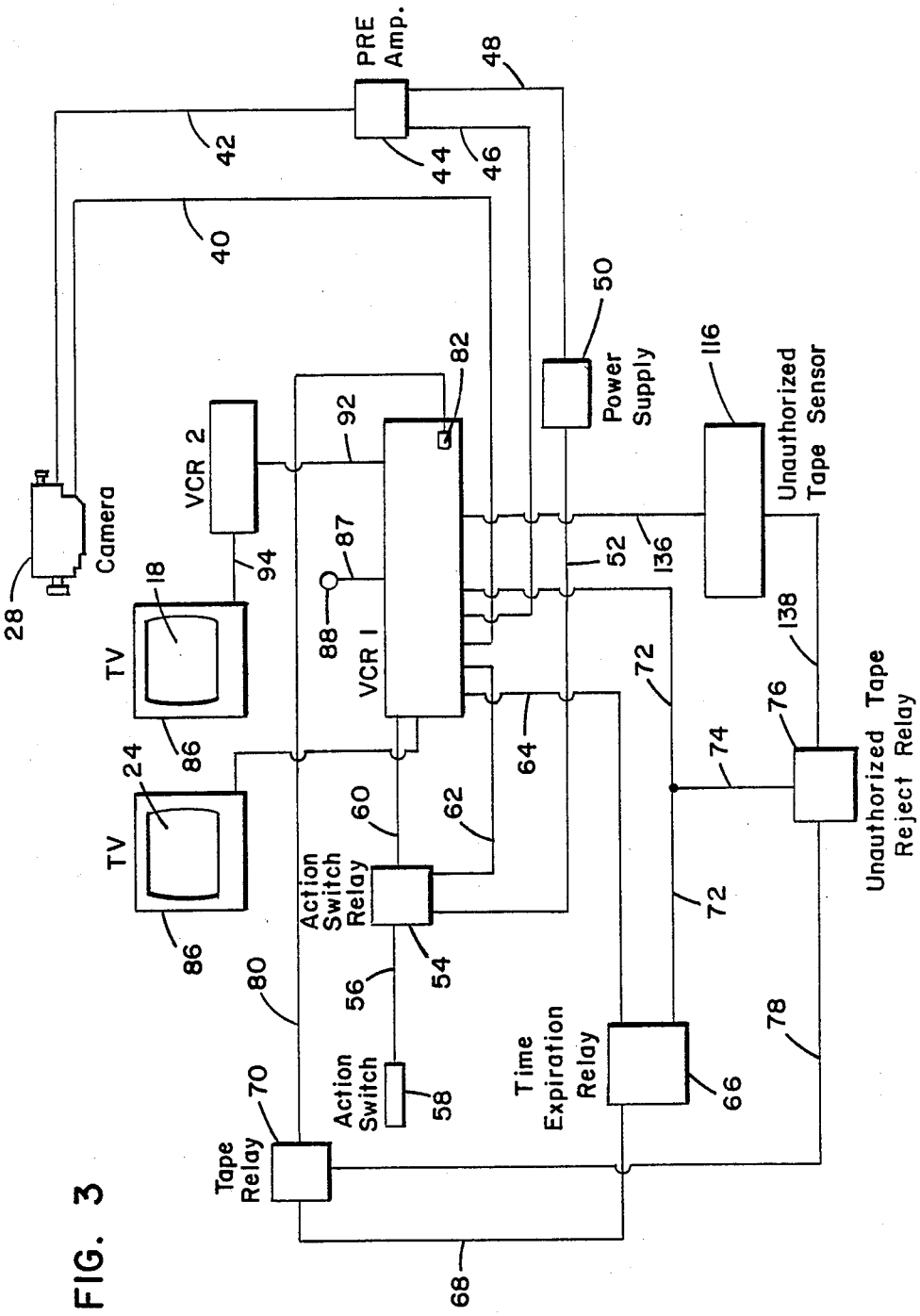
FIG. 3 is a diagrammatic representation of electronic components of the preferred embodiments of the invention.

A second video cassette recorder which is generally designated as VCR 2 in FIG. 3 and which may also be General Electric's model 9-7100 recorder, is mounted in the portion of the booth behind the partition to be inaccessible to the user of the booth. An operation control lead 92 extends between VCR 1 and VCR 2, and a lead 94 connects VCR 2 to the outside television set 16 shown in FIG. 1.

MODE OF OPERATION

Figure 4:
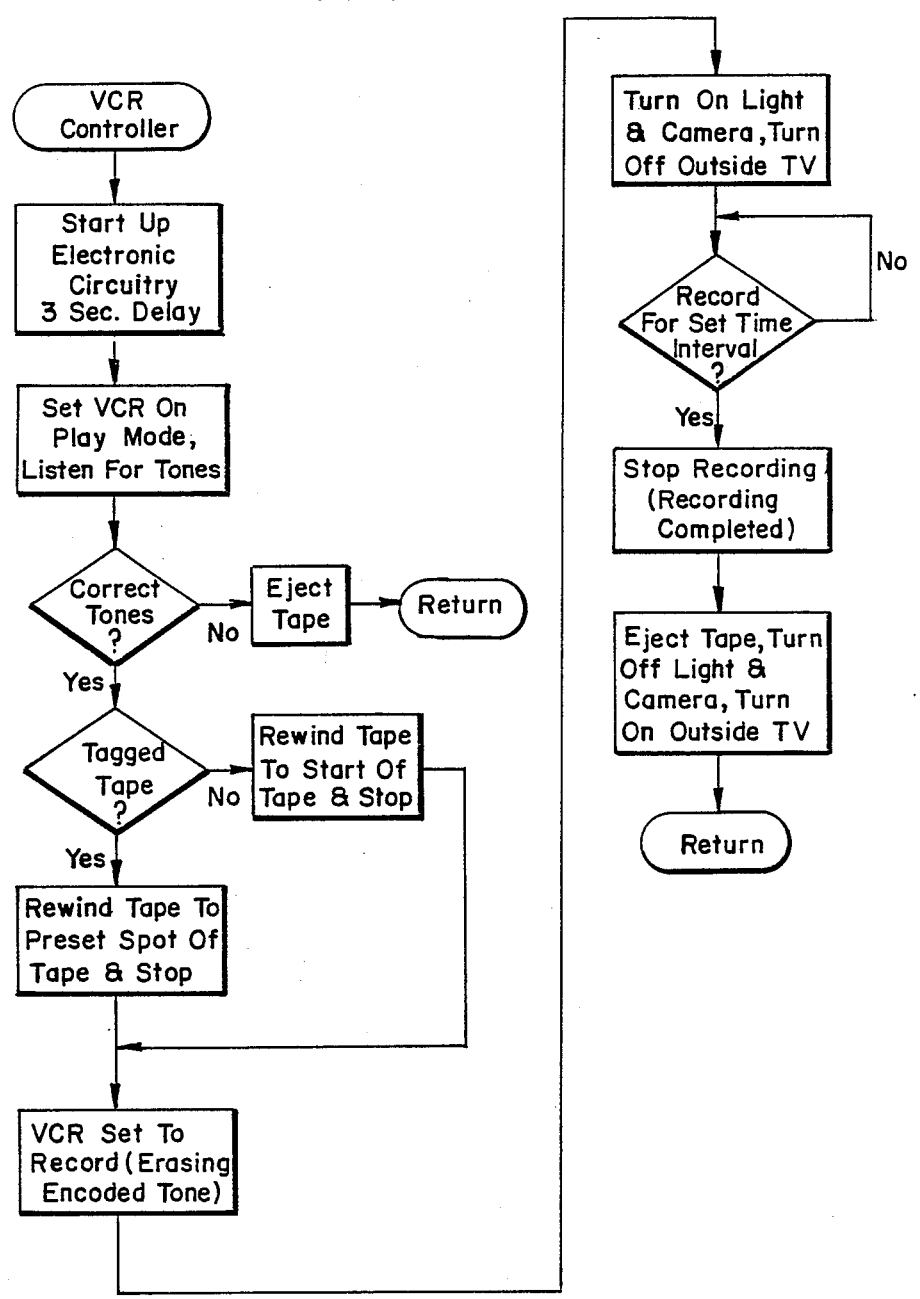
FIG. 4 is a flow chart of operation of the invention.

Operation of the system is indicated in outline form in the flow chart in FIG. 4. The video recording system is designed for use only with authorized tapes. Authorized tapes having a pre-determined length, such as, for example, ten minutes, are sold in proximity to the recording booth. Thus, for example, if the booth is located in a department store, authorized cassettes are sold at an adjacent counter. Profit from use of the video recording booth comes from the sale of such authorized tapes. A credit card operated vending machine may be used if desired. The authorized cassettes have a physical characteristic different from unauthorized cassettes, which can be sensed by the recording system to distinguish authorized and unauthorized users. This prevents an unscrupulous user from bringing his own video cassette which may be of a very long length, thereby preventing the proprietor of the booth from earning a profit and pre-empting use of the booth for an extraordinary period of time.

Any of a variety of physical characteristics of the video cassette can be modified to distinguish an authorized from an unauthorized cassette. Thus, for example, a conductive foil may be applied to the exterior of the cassette in a location that can be sensed by an unauthorized tape switch to prevent activation of the system and eject the unauthorized cassette. It is preferred, however, to employ a pre-recorded signal on the tape in the cassette, which distinguishes the authorized cassette. This may be, for example, a series of pre-recorded tones or a digital code which can be sensed by the user operated VCR in the system. For this purpose, an audio signal from the VCR is fed to the unauthorized tape sensor which, if it does not sense an appropriate recorded signal on the tape, signals the tape reject relay to terminate any recording session.

A recording session is initiated when a user places an authorized tape in VCR 1. The VCR controller starts up the electronic circuitry with a total delay of about three seconds. The VCR first switches to the playing mode and the audio signal is routed to the unauthorized tape sensor 16 to listen for the correct tones which indicate an authorized tape. If the correct tones are not sensed, the tape is ejected and the system resets to the original condition.

If authorized tones are detected, the playing mode is discontinued and the tape is rewound to a preset spot. Either of two types of tapes may be used. An essentially blank tape may be used, in which case the tape is rewound to the beginning. Preferably the tape used has a pre-recorded message for the first portion of the tape. In that event, the tape is rewound to the end of the pre-recorded message and stops at that point, awaiting recording by the customer.

Such a pre-recorded message may be useful for enhancing salability of tapes. Happy Birthday or other congratulatory or greeting messages may be pre-recorded. Where the booth is in a resort area, tapes may be sold with a pre-recorded message characteristic of that locale. For example, a tourist visiting Hawaii may desire to purchase a tape with a pre-recorded band of ukuleles and hula dancers or scenic shots of the islands. Tones or other signals distinguishing an authorized tape from an unauthorized tape are recorded immediately following such a pre-recorded message. After recording such a message and signal, the tape is rewound to a location between the message and signal before being sold.

When the recording session commences, the user VCR is set to record from the beginning of the tape or from the preset location after the pre-recorded message. This recording by the user erases the pre-recorded tones or other characterizing signal, thereby preventing reuse of the same video cassette in this system. At the commencement of recording, the light 32 in the video booth is turned on to assure sufficient illumination for the video camera. At that same time, the outside TV is turned off.

The outside TV is typically operated with an advertising message, samples of pre-recorded messages and the like. These are displayed when the booth is not in use to entice customers to use the video recording system. The outside TV is operated by the second video cassette recorder VCR-2 inside the booth. The outside TV may be turned off during use of the booth to prevent interference, or may be continued during use of the booth to show the person or persons recording a message. Whether to have the outside TV turned on for such a recording session can be left to the option of the user of the system who may prefer either privacy during recording or a display to let others in his party observe during the recording.

It might be noted that during the recording session the person can monitor the recording by way of the inside television monitor 24. When the customer wishes to record his picture and voice on the cassette, he may press the action switch 58 which activates the camera and microphone and turns on the signal light 88 to notify the customer that his picture is being recorded. An interval timer may also be provided on the partition wall 22 in the booth so that the customer can be aware of the time remaining in a preset interval for which recording is authorized.

The VCR records for a preset time interval corresponding to the length of tape in the video cassette. If the recording session is interrupted, it can be resumed to complete the preset interval. A timer is employed in the illustrated embodiment for controlling the length of a recording session. Alternatively the end of the tape on the cassette may signal the end of the session. A combination of these two may be used when the person in the booth has control to interrupt recording during the session. When the recording is completed, at the end of the preset interval or end of the tape, the interior light and camera are turned off and recording is stopped. The outside TV is turned on to again display advertising messages or the like. The recorded tape is ejected for the happy customer to take with him or mail to friends or relatives.

A hallmark of a successful video recording system employed by the public is simplicity. One cannot rely on untrained members of the public to operate sophisticated equipment unless it is substantially completely automated. Thus in practice of this invention, insertion of the video cassette in the VCR is about all that the customer has to do. An action switch may be included so that the customer may interrupt the recording session. Other than that, the system is essentially completely automated.

Although one embodiment of a simple recording system has been described and illustrated herein. Many modifications and variations will be apparent to one skilled in the art. Although it is desirable to employ a simple system where the user has few acts to perform for initiating a recording session, practice of this invention may include more sophisticated and complicated procedures. For example, if desired, prerecorded backdrops may be included in the recording system so that the user in the booth can superimpose the image being recorded on a prerecorded backdrop. Additional controls may be provided so that the user can zoom between different focal lengths of the camera and vary the image size. Background music or the like may also be provided in the booth according to selection made by the user. Other such additional features may be included without departing from principles of this invention. It is therefore to be understood that within the scope of the appended claims the invention may be practiced otherwise than as specifically described.

What is claimed is:

1. A video recording system comprising:
    a camera producing a video picture signal when operated;
    a video cassette recorder connected to the camera for recording the video picture signal on a video cassette; and
    means for enabling operation of the camera if the cassette possesses a predetermined physical characteristic and for preventing operation of the camera if the cassette does not possess the predetermined physical characteristic.

2. A recording system as recited in claim 1 wherein the means for enabling or preventing comprises means for sensing a prerecorded signal on the tape of the video cassette.

3. A recording system as recited in claim 2 comprising means for erasing the prerecorded message when the cassette is used.

4. A recording system as recited in claim 2 comprising means for rewinding the tape in the cassette to a predetermined location preceding the recorded signal before commencing recording of a video signal on the tape.

5. A recording system as recited in claim 1 comprising a booth closable for a degree of privacy, and means for mounting the camera for viewing a person or persons in the booth.

6. A recording system as recited in claim 5 comprising a video picture display screen positioned inside the booth and means for feeding the video picture signal to the video display screen so that th picture being recorded is displayed on the screen.

7. A recording system as recited in claim 1 comprising means for altering the physical characteristic of the cassette during a recording session for preventing reuse of the cassette in the recording system.

8. A recording system as recited in claim 1 comprising timing means operatively connected to the camera for operating the camera for a predetermined period.

9. A method for operating a video recording system comprising the steps of:
    sensing presence or absence of a prerecorded signal on the tape of a video cassette;
    rejecting the video cassette in the event of absence of the prerecorded signal;
    rewinding the tape in the video cassette in the event of presence of the prerecorded signal; and
    recording on the rewound tape for erasing the prerecorded signal.

10. A method as recited in claim 9 wherein the video cassette includes a prerecorded message before the prerecorded signal and comprising the step of rewinding the tape to a location between the message and signal before recording.

* * * * *